US010601553B2

(12) United States Patent
Huang

(10) Patent No.: US 10,601,553 B2
(45) Date of Patent: Mar. 24, 2020

(54) METHOD AND APPARATUS FOR IMPROVING HARQ FEEDBACK IN SHORTENED TTI IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/793,226

(22) Filed: Oct. 25, 2017

(65) Prior Publication Data
US 2018/0123743 A1    May 3, 2018

Related U.S. Application Data

(60) Provisional application No. 62/414,358, filed on Oct. 28, 2016.

(51) Int. Cl.
*H04L 1/18* (2006.01)
*H04L 5/00* (2006.01)
*H04W 72/04* (2009.01)

(52) U.S. Cl.
CPC .......... *H04L 1/1854* (2013.01); *H04L 1/1812* (2013.01); *H04L 1/1861* (2013.01); *H04L 5/0055* (2013.01); *H04W 72/0406* (2013.01); *H04L 1/1803* (2013.01)

(58) Field of Classification Search
CPC ... H04L 5/0055; H04L 1/1812; H04L 1/1861; H04L 5/0053; H04L 1/1854; H04L 1/1864; H04L 1/1822; H04L 1/1893; H04L 1/1829; H04W 72/0413; H04W 72/0446; H04W 72/0453; H04W 72/0406
See application file for complete search history.

(56) References Cited

U.S. PATENT DOCUMENTS

| 8,341,481 B2* | 12/2012 | Lee ...................... H04L 1/1854 370/312 |
| 9,072,086 B2* | 6/2015 | Papasakellariou ........................... H04W 72/0406 |
| 2007/0165576 A1* | 7/2007 | Wang ................... H04B 7/0691 370/335 |
| 2008/0084844 A1* | 4/2008 | Reznik .................. H04L 1/0025 370/330 |

(Continued)

FOREIGN PATENT DOCUMENTS

EP    3043502    7/2016

OTHER PUBLICATIONS

European Search Report from corresponding EP Application No. 17198236.6, dated Mar. 19, 2018.

*Primary Examiner* — Magdi Elhag
(74) *Attorney, Agent, or Firm* — Blue Capital Law Firm, P.C.

(57) ABSTRACT

Methods and apparatuses for improving HARQ feedback in shortened TTI in a wireless communication system are disclosed herein. In one method, a user equipment is configured with a processing interval between receiving a downlink data and transmitting a corresponding acknowledgement (ACK)/negative acknowledgement (NACK) response. The UE receives downlink data with 1 millisecond TTI at a downlink subframe. The UE transmits the ACK/NACK response of the downlink data on a resource at an uplink subframe, wherein the resource is based on an offset value if the processing interval is shorter than 4 milliseconds.

27 Claims, 10 Drawing Sheets

(56) References Cited

U.S. PATENT DOCUMENTS

| | | | |
|---|---|---|---|
| 2010/0211845 A1* | 8/2010 | Lee | H04L 1/1854 |
| | | | 714/749 |
| 2012/0250592 A1* | 10/2012 | Chun | H04L 1/1887 |
| | | | 370/280 |
| 2014/0119314 A1 | 5/2014 | Pajukoski | |
| 2014/0219259 A1* | 8/2014 | Lin | H04W 56/00 |
| | | | 370/336 |
| 2015/0358137 A1 | 12/2015 | Chae | |
| 2016/0205540 A1* | 7/2016 | Wu | H04L 1/1854 |
| | | | 370/329 |
| 2016/0323070 A1* | 11/2016 | Chen | H04W 56/0045 |
| 2017/0135084 A1* | 5/2017 | Kuchibhotla | H04L 5/0007 |
| 2017/0142712 A1 | 5/2017 | Lee et al. | |
| 2017/0290008 A1* | 10/2017 | Tooher | H04L 1/0007 |
| 2017/0332397 A1* | 11/2017 | Li | H04L 1/1861 |
| 2018/0042015 A1* | 2/2018 | Yin | H04W 72/0446 |
| 2018/0048447 A1* | 2/2018 | Nogami | H04B 7/0626 |
| 2018/0213544 A1* | 7/2018 | Miao | H04L 1/0027 |

* cited by examiner

| UL-DL Configuration | Subframe *n* | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 5 (PRIOR ART)

| n-4 | n-3 | n-2 | n-1 |
|---|---|---|---|
| 0~38 | 39~77 | 77~83 | 84~89 |

| n-4 | n-3 | n-2 | n-1 |
|---|---|---|---|
| 0~38 | 39~77 | 77~83 | 84~101 |

METHOD AND APPARATUS FOR IMPROVING HARQ FEEDBACK IN SHORTENED TTI IN A WIRELESS COMMUNICATION SYSTEM

CROSS-REFERENCE TO RELATED APPLICATIONS

The present application claims the benefit of U.S. Provisional Patent Application Ser. No. 62/414,358 filed on Oct. 28, 2016, the entire disclosure of which is incorporated herein in its entirety by reference.

FIELD

This disclosure generally relates to wireless communication networks, and more particularly, to a method and apparatus for improving hybrid automatic repeat request (HARQ) feedback in shortened TTI in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for improving HARQ feedback in shortened TTI in a wireless communication system are disclosed herein. In one method, a user equipment is configured with a processing interval between receiving a downlink data and transmitting a corresponding acknowledgement (ACK)/negative acknowledgement (NACK) response. The UE receives downlink data with 1 millisecond TTI at a downlink subframe. The UE transmits the ACK/NACK response of the downlink data on a resource at an uplink subframe, wherein the resource is based on an offset value if the processing interval is shorter than 4 milliseconds.

BRIEF DESCRIPTION OF THE DRAWINGS

FIG. 5 is a reproduction of Table 10.1-1 from 3GPP TS 36.211 V8.9.0 illustrating Downlink association set index $K:\{k_0, k_1, \ldots k_{M-1}\}$ for TDD.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.881 V14.0.0, "Study on latency reduction techniques for LTE"; TSG RAN WG1 Meeting #86 RAN1 Chairman's Notes; TS 36.211 V8.9.0, "Physical Channels and Modulation"; and TS 36.331 V8.21.0, Radio Resource Control (RRC), Protocol specification. The standards and documents listed above are hereby expressly incorporated by reference in their entirety.

Figure 1:
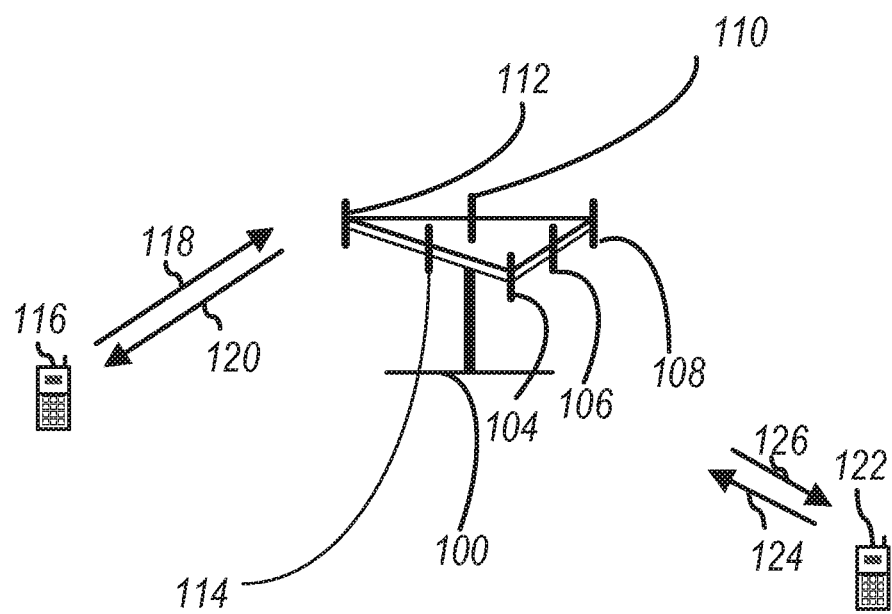
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
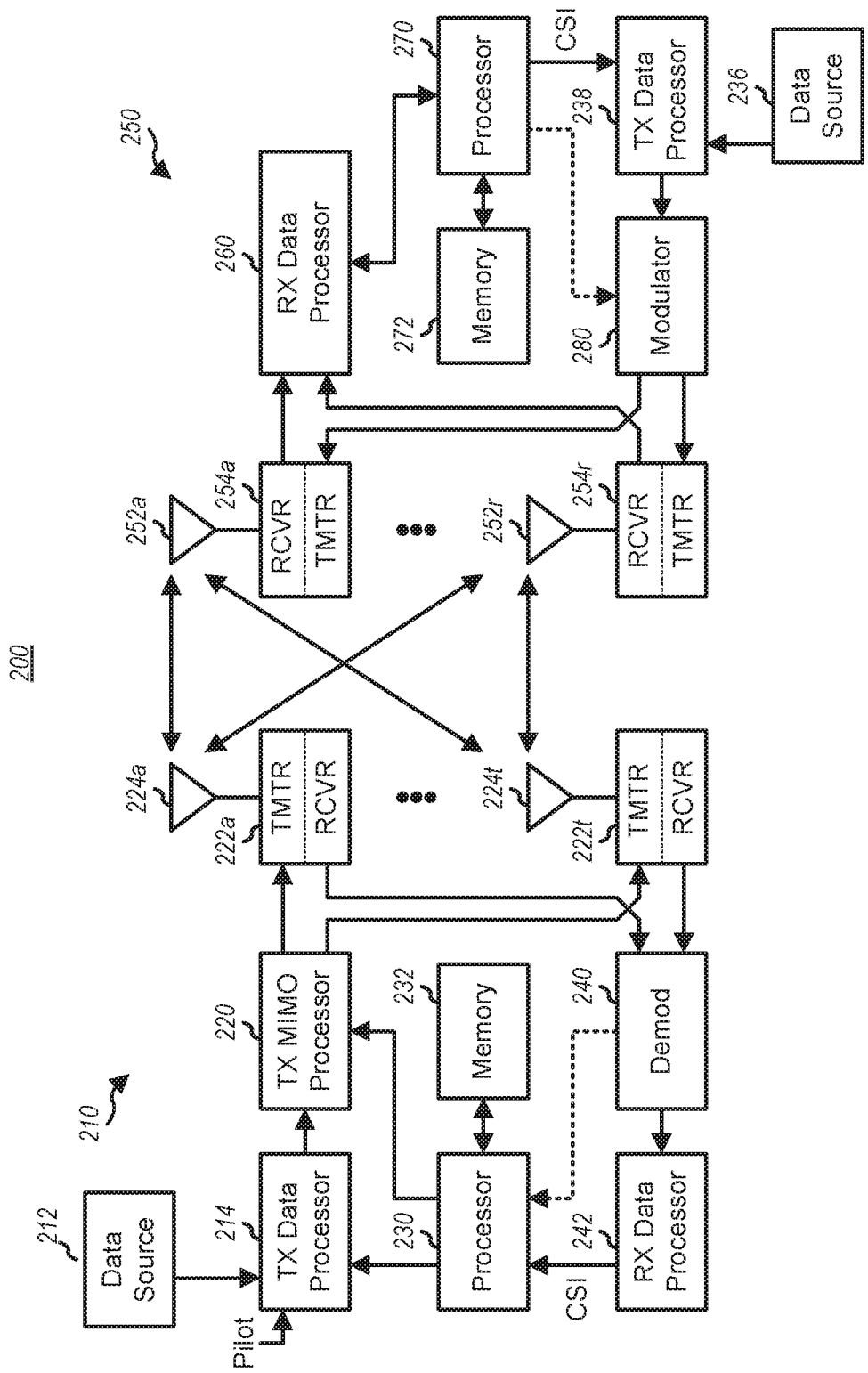
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
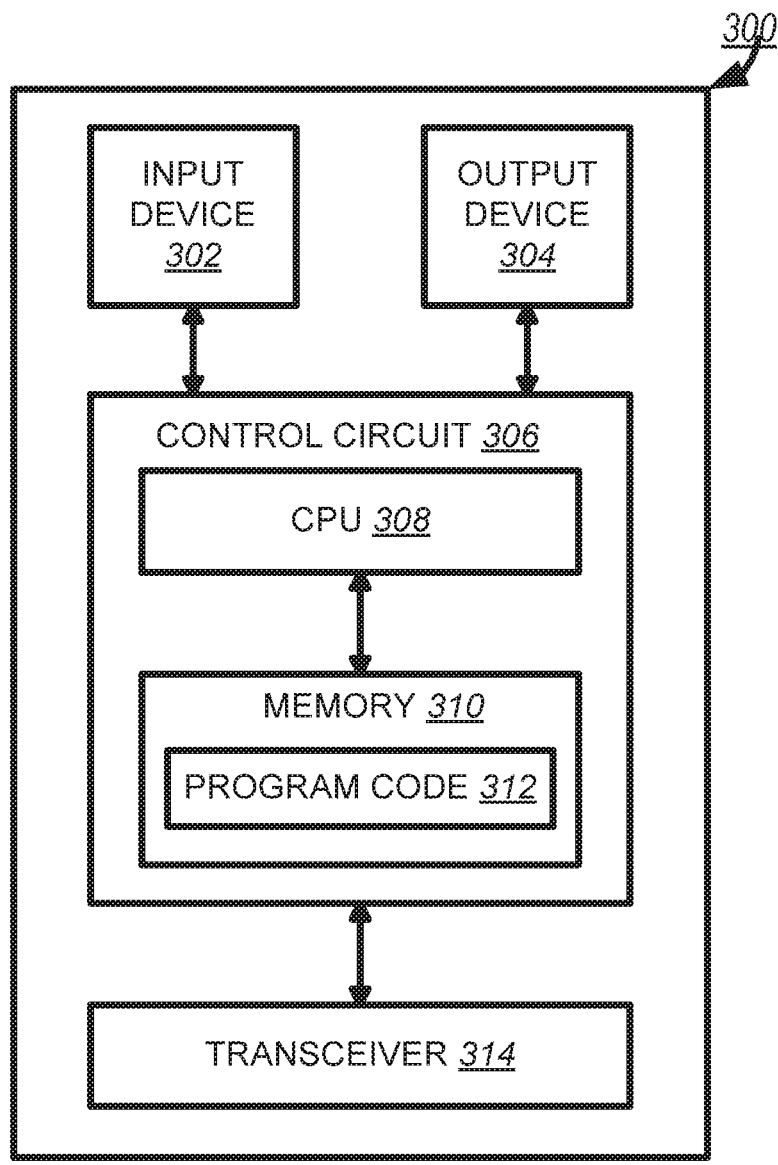
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
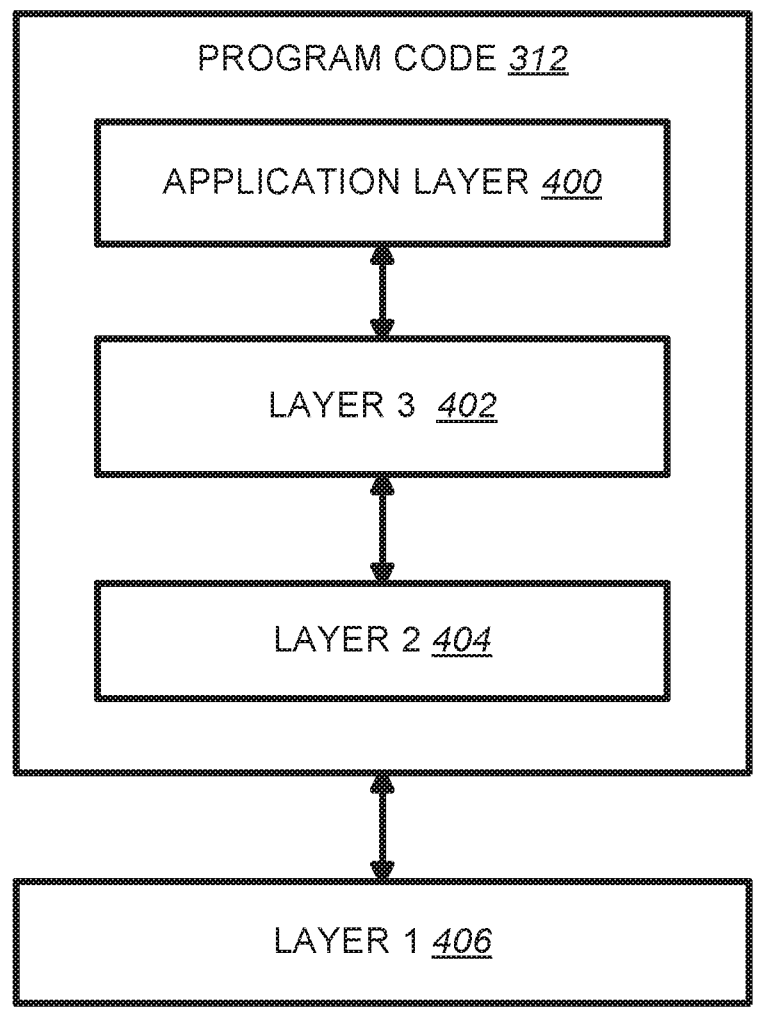
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.211 V8.9.0 describes hybrid automatic repeat request (HARD) procedures as follows:

10.1 UE procedure for determining physical uplink control channel assignment Uplink control information (UCI) in subframe n shall be transmitted
  on PUCCH using format 1/1a/1b or 2/2a/2b if the UE is not transmitting on PUSCH in subframe n
  on PUSCH if the UE is transmitting on PUSCH in subframe n unless the PUSCH transmission corresponds to a Random Access Response Grant or a retransmission of the same transport block as part of the contention based random access procedure, in which case UCI is not transmitted Throughout this section, subframes are numbered in monotonically increasing order; if the last subframe of a radio frame is denoted k, the first subframe of the next radio frame is denoted k+1.

The following combinations of uplink control information on PUCCH are supported:
  HARQ-ACK using PUCCH format 1a or 1b
  HARQ-ACK using PUCCH format 1b with channel selection
  Scheduling request (SR) using PUCCH format 1
  HARQ-ACK and SR using PUCCH format 1a or 1b
  CQI using PUCCH format 2
  CQI and HARQ-ACK using PUCCH format
    2a or 2b for normal cyclic prefix
    2 for extended cyclic prefix The scrambling initialization of PUCCH format 2, 2a and 2b is by C-RNTI.

The parameter Simultaneous-AN-and-CQI provided by higher layers determine if a UE can transmit a combination of CQI and HARQ-ACK on PUCCH in the same subframe. For TDD, two ACK/NACK feedback modes are supported by higher layer configuration.
  ACK/NACK bundling and
  ACK/NACK multiplexing For TDD UL-DL configuration 5, only ACK/NACK bundling is supported.

TDD ACK/NACK bundling is performed per codeword across M multiple DL subframes associated with a single UL subframe n, where M is the number of elements in the set K defined in Table 10.1-1, by a logical AND operation of all the individual PDSCH transmission (with and without corresponding PDCCH) ACK/NACKs and ACK in response to PDCCH indicating downlink SPS release. The bundled 1 or 2 ACK/NACK bits are transmitted using PUCCH format 1a or PUCCH format 1b, respectively.

For TDD ACK/NACK multiplexing and a subframe n with M>1, where M is the number of elements in the set K defined in Table 10.1-1, spatial ACK/NACK bundling across multiple codewords within a DL subframe is performed by a logical AND operation of all the corresponding individual ACK/NACKs and PUCCH format 1b with channel selection is used. For TDD ACK/NACK multiplexing and a subframe n with M=1, spatial ACK/NACK bundling across multiple codewords within a DL subframe is not performed, 1 or 2 ACK/NACK bits are transmitted using PUCCH format 1a or PUCCH format 1b, respectively.

For FDD, the UE shall use PUCCH resource $n_{PUCCH}^{(1)}$ for transmission of HARQ-ACK in subframe n, where
  for a PDSCH transmission indicated by the detection of a corresponding PDCCH in subframe n−4, or for a PDCCH indicating downlink SPS release (defined in section 9.2) in subframe n−4, the UE shall use $n_{PUCCH}^{(1)} = n_{CCE} + N_{PUCCH}^{(1)}$, where $n_{CCE}$ is the number of the first CCE used for transmission of the corresponding DCI assignment and $N_{PUCCH}^{(1)}$ is configured by higher layers.
  for a PDSCH transmission where there is not a corresponding PDCCH detected in subframe n−4, the value of $n_{PUCCH}^{(1)}$ is determined according to higher layer configuration and Table 9.2-2.

For TDD ACK/NACK bundling or TDD ACK/NACK multiplexing and a subframe n with M=1 where M is the number of elements in the set K defined in Table 10.1-1, the UE shall use PUCCH resource $n_{PUCCH}^{(1)}$ for transmission of HARQ-ACK in subframe n, where
  If there is PDSCH transmission indicated by the detection of corresponding PDCCH or there is PDCCH indicating downlink SPS release within subframe(s) n−k, where k∈K and K (defined in Table 10.1-1) is a set of M elements {$k_0, k_1, \ldots k_{M-1}$} depending on the subframe n and the UL-DL configuration (defined in Table 4.2-2 in [3]), the UE first selects a p value out of {0, 1, 2, 3} which makes $N_p \le n_{CCE} < N_{p+1}$ and shall use $n_{PUCCH}^{(1)} = (M-m-1) \times N_p + m \times N_{p+1} + n_{CCE} + N_{PUCCH}^{(1)}$, where $N_{PUCCH}^{(1)}$ is configured by higher layers, $N_p = \max\{0, \lfloor [N_{RB}^{DL} \times (N_{sc}^{RB} \times p - 4)]/36 \rfloor\}$, and $n_{CCE}$ is the number of the first CCE used for transmission of the corresponding PDCCH in subframe $n-k_m$ and the corresponding m, where $k_m$ is the smallest value in set K such that UE detects a PDCCH in subframe $n-k_m$.
  If there is only a PDSCH transmission where there is not a corresponding PDCCH detected within subframe(s) n−k, where k∈K and K is defined in Table 10.1-1, the value of $n_{PUCCH}^{(1)}$ is determined according to higher layer configuration and Table 9.2-2.

FIG. 5 (reproduction of Table 10.1-1 from 3GPP TS 36.211 V8.9.0).

For TDD ACK/NACK multiplexing and sub-frame n with M>1, where M is the number of elements in the set K defined in Table 10.1-1, denote $n_{PUCCH,i}^{(1)}$ as the ACK/NACK resource derived from sub-frame $n-k_i$ and HARQ-ACK(i) as the ACK/NACK/DTX response from sub-frame $n-k_i$, where $k_i \in K$ (defined in Table 10.1-1) and $0 \le i \le M-1$.
  For a PDSCH transmission or a PDCCH indicating downlink SPS release in sub-frame $n-k_i$ where $k_i \in K$, the ACK/NACK resource $n_{PUCCH,i}^{(1)} = (M-i-1) \times N_p + i \times N_{p+1} + n_{CCE,i} + N_{PUCCH}^{(1)}$, where p is selected from {0, 1, 2, 3} such that $N_p \le n_{CCE} < N_{p+1}$, $N_p = \max\{0, \lfloor [N_{RB}^{DL} \times (N_{sc}^{RB} \times p - 4)]/36 \rfloor\}$, $n_{CCE,i}$ is the number of the first CCE used for transmission of the corresponding PDCCH in subframe $n-k_i$, and $N_{PUCCH}^{(1)}$ is configured by higher layers.
  For a PDSCH transmission where there is not a corresponding PDCCH detected in subframe $n-k_i$, the value of $n_{PUCCH,i}^{(1)}$ is determined according to higher layer configuration and Table 9.2-2.

The UE shall transmit b(0),b(1) on an ACK/NACK resource $n_{PUCCH}^{(1)}$ in sub-frame n using PUCCH format 1b according to section 5.4.1 in [3]. The value of b(0),b(1) and the ACK/NACK resource $n_{PUCCH}^{(1)}$ are generated by channel selection according to Table 10.1-2, 10.1-3, and 10.1-4 for M=2, 3, and 4, respectively. In case b(0),b(1) are mapped to "N/A," then the UE shall not transmit ACK/NACK response in sub-frame n.

In 3GPP TS 36.211 V8.9.0, the details of determining a Physical Uplink Control Channel (PUCCH) resource associated with the downlink control channel element are described in sections 5.1, 5.4, 6, and 7. In 3GPP TS 36.331 V8.21.0, some configurations for HARQ process and obtaining procedure are captured.

Latency reduction is a feature discussed in the Chairman's Notes for 3GPP TSG RAN WG1 Meeting #86 RAN1. One way to reduce latency is through shorting the time transmission interval (TTI) length and therefore, may result in shorter processing time and round-trip time (RTT). Furthermore, there are two possible short TTI lengths 2 os, 7 os for downlink and three 2 os, 4 os, 7 os for uplink in frequency-division duplex (FDD) mentioned in 3GPP TR 38.881 V14.0.0.

Similar to the legacy LTE, shortened Physical Uplink Control Channel (sPUCCH) is used for transmitting the ACK/NACK response of shortened Physical Downlink Shared Channel (sPDSCH) transmission and resources for the sPUCCH is determined by the minimum control channel element index of shortened Physical Downlink Control Channel (sPDCCH) which indicates the corresponding sPDSCH. In addition, the minimum processing time is also proportional to the sTTI length. For example, a UE configured with short TTI operation shall transmit the sPUCCH containing the ACK/NACK response at sTTI index #m+4 if sPDSCH is received at sTTI index #m.

However, it is possible that legacy PUCCH and sPUCCH with possible sTTI length(s) will be transmitted at the same subframe, which may result in an unavoidable collision. This collision may occur because the UE may use the same PUCCH and/or sPUCCH resource index due to the same minimum Control Channel Element (CCE) index of PDCCH and/or sPDCCH with different TTI and/or sTTI length to transmit the ACK/NACK response. One possible solution to solve this issue is similar to the legacy Time Division Duplex (TDD) multiplexing/bundling. That is, downlink transmission with different sTTI length will choose different sPUCCH resource index indicating different resources to feedback each ACK/NACK response. However, this may cause resource waste because two slot-based ACK/NACK responses of two sPDSCHs transmitted in same uplink subframe may share the same resource index. Hence, sPUCCH resource index used for first slot sPDSCH can also be reused by the second slot sPDSCH. Therefore, considering resource use efficiency, other solutions to solve this issue should be contemplated.

In addition, considering the cost of the Physical Resource Block (PRB), it is contemplated to multiplex sPUCCH of different lengths in the same PRB. For the above purpose, this specification focuses on the multiplexing problem between 2 os sPUCCH, slot-based sPUCCH and legacy PUCCH because 4 os may be too difficult to solve.

One possible solution is multiplexing ACK/NACK responses of different TTI lengths in an efficient manner. In one embodiment, there are X number of shortened TTIs whose lengths are shorter than one subframe. Ideally, the value of X is more than one. Also, the TTI length within X TTIs is the same. Alternatively, the TTI length within X TTIs is different and the difference is one-symbol. Based on the assumptions disclosed in 3GPP TR 38.881 V14.0.0, ideally, there are no shortened TTI spanning over the subframe boundary. Ideally, the shortened TTI will not cross the slot boundary. For example, if a two-symbol TTI is configured, most shortened TTIs would be two-symbols, and any three-symbols TTI will be introduced in order to use the left symbol in each slot. Ideally, there are Y shortened TTIs whose lengths are shorter than or equal to one subframe. Ideally, the value of Y is more than or equal to one. Ideally, the TTI length within Y TTIs is the same.

In another alternative, the ACK/NACK response of a downlink data transmission in a TTI within X TTIs will be transmitted on a first resource set at a specific uplink subframe. In one embodiment, the ACK/NACK response of a downlink data transmission in a TTI within Y TTIs will be transmitted on a second resource set at a specific uplink subframe. Ideally, the specific uplink subframe is the same.

Figures 6, 7:
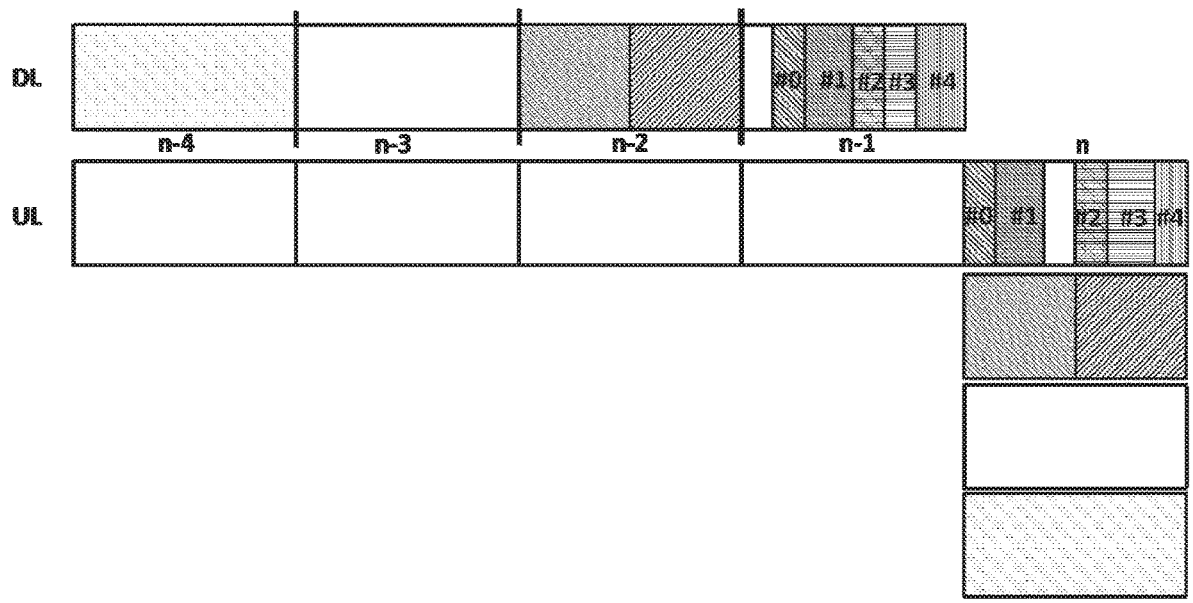
FIG. 6 is a diagram illustrating the relationship between PDSCH/sPDSCH and PUCCH/sPUCCH.
FIG. 7 is a table illustrating the range size for different resources for different subframes.

In one embodiment, referring to FIG. 6, there are four possible downlink subframes that will transmit an ACK/NACK response at the specific uplink subframe #n due to the different and proportional processing times: PDSCH transmission in subframe #n−4 with processing time 4 milliseconds, PDSCH transmission in subframe #n−3 with processing time 3 milliseconds, two slot-based TTI sPDSCH transmission in subframe #n−2, and multiple two symbols duration TTIs sPDSCH transmission in subframe #n−1.

In one embodiment, referring to FIG. 6, there are three second resource sets for subframes #n−4, #n−3, #n−2 and one first resource set for subframe #n−1 at the specific uplink subframe #n.

In one embodiment, referring to FIG. 6, the four resource sets are non-overlapping.

FIG. 7 illustrates resource index of an uplink subframe indexed as #n for downlink data transmission in different downlink subframes which corresponding ACK/NACK response is transmitted in the uplink subframe #n. For example, with $N_{RB}^{DL}=100$, 61 PRBs for short TTI transmission and 39 PRBs for 1 milliseconds TTI transmission in each downlink subframe, estimated CCE number for 1 milliseconds TTI in each downlink subframe is 39 if 3 OFDM symbols control region for 1 milliseconds TTI is assumed. Hence, resource set for subframe #n−4 is indexed from 0 to 38 and resource set for subframe #n−3 is indexed from 39 to 77. Based on 61 PRBs for short TTI transmission, estimated short-TTI capable UE number for 7 os TTI in subframe #n−2 is 7 and estimated short-TTI capable UE number for 2 os TTI in subframe #n−1 is 6. Hence, resource set for subframe #n−2 is indexed from 77 to 83 and resource set for subframe #n−1 is indexed from 84 to 89.

Figures 8, 9:
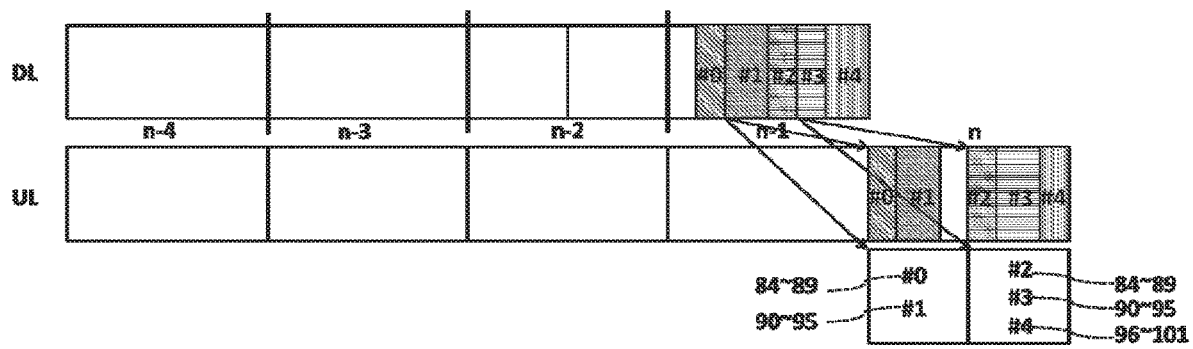
FIG. 8 is a table illustrating the range size for different resources for different subframes.
FIG. 9 is a diagram of one exemplary embodiment illustrating the first resource set being separated based on an order of the resource index.

FIG. 8 illustrates the range sizes for different subframes. A resource number, for example, in the case of the resource for transmitting an ACK/NACK response for downlink data using TTI, which is one of X TTIs that are configured slot-based TTIs, the size of the first resource set is X/2, which rounds up to an integer times than the first resource set.

In one exemplary method, separate offset values are used to separate each resource set. In one alternative, the separate offset values are different. In another alternative, different offset values can be broadcast by the network.

In another exemplary method to separate resource sets, the lowest resource index in the first or the second resource set is the sum of the sizes of the other resource sets which are used for the different downlink subframe(s). The different downlink subframe(s) may be those downlink subframe(s) earlier than a downlink subframe associated with the first resource set. For example, referring to FIG. 7, the lowest resource index of the resource set of subframe #n−2 is the sum of the sizes of the resource sets used for subframe #n−4 and subframe #n−3.

The size of the resource set for each downlink subframe is based on the maximum possible transmission number in a TTI. In one alternative, the size of the resource set for a TTI in one downlink subframe is based on total number of CCE in the TTI, which is calculated by the allocated bandwidth for the TTI even if the bandwidth is not allocated for control. For example, referring to FIG. 6, if the bandwidth of the slot-based TTI in subframe #n−2 is $N_{RB}^{slot-based}$ PRB, then the size of the resource set for the slot-based TTI in subframe #n−2 is $\lfloor [N_{RB}^{slot-based} \times (N_{sc}^{RB}-4)]/36 \rfloor$.

In another exemplary method, the size of resource set for each downlink subframe is based on the predefined number of the band. For example, referring to FIG. 7, if there are five bands allocated for every slot-based TTI in subframe #n−2, the size of the resource range for slot-based TTI in downlink subframe #n−2 is five.

In one embodiment, the resource for transmitting the ACK/NACK response of the downlink transmission will be determined based on a minimum CCE index of the control information indicating that transmission.

In one embodiment, the resource for transmitting the ACK/NACK response of the downlink transmission will be based on a resource allocation index of that transmission.

In one embodiment, the combination of two-symbol/three-symbol TTI will be non-overlapping with each other and span the subframe.

In one embodiment, a UE is configured the TTI(s) for downlink data which is shorter than one subframe, in which there are X TTIs in one subframe. The UE is configured the TTI for ACK/NACK response which is different from the configured TTI for the downlink data. Resources for transmitting the ACK/NACK response for the configured TTIs for downlink data corresponding to a first TTI for the ACK/NACK response are within a first resource set in the first TTI. Resources for transmitting the ACK/NACK response for the configured TTIs for downlink data corresponding to a second TTI for the ACK/NACK response are within a first resource set in the second TTI.

In one embodiment, referring to FIG. 9, the downlink data transmission is in two-symbols or three symbols and is configured to slot-based TTI for the corresponding ACK/NACK response. The ACK/NACK transmission in the first slot TTI uses resources within the first resource which is then reused in the second slot TTI.

In one embodiment, referring to FIG. 9, a separation method to distinguish the resources of different downlink TTIs has the first resource set separated equally into three parts based on the resource index, which is the number of the lowest resource index from the first part of the resource index.

Figure 10:
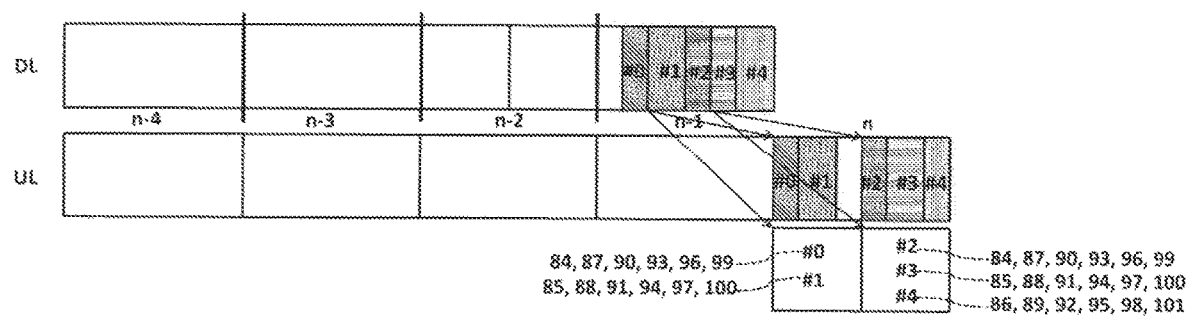
FIG. 10 is a diagram of one exemplary embodiment illustrating the first resource set being separated based on an order of the TTI index.

In one embodiment, referring to FIG. 10, a separation method to distinguish the resources of different downlink TTI has the first resource set separated equally into three parts based on the TTI index.

In one embodiment, if a UE configured, two-symbol/three-symbol TTI length combination receives a plurality of downlink transmissions in two-symbol/three-symbol TTI lengths at a same downlink subframe and each corresponding ACK/NACK response will be transmitted in two-symbol/three-symbol TTI at a same uplink subframe, the UE can use a same resource index indicating resources on the corresponding two-symbol/three symbol TTI to transmit ACK/NACK response of the downlink transmissions.

In one embodiment, if a UE configured, slot-based TTI length receives two slot-based downlink transmissions at different slot-TTI of a same downlink subframe and each corresponding ACK/NACK response will be transmitted on each slot-based TTI at a same uplink subframe, the UE can use a same resource index indicating resources on the corresponding slot-based TTI to transmit ACK/NACK response of the slot-based downlink transmissions.

In one embodiment, the combination of two-symbols/three-symbols TTI in each slot will be in the following order: two-symbol TTI, three-symbol TTI, and two-symbol TTI. In one embodiment, based on the above combinations, a UE configured, two-symbol/three-symbol TTI length can transmit the ACK/NACK response on the resource that can be multiplexed in the PUCCH format 1a/1b in the same PRB. In one embodiment, since the constraint of the orthogonal length for each two-symbol TTI is two, the number of the orthogonal sequence will decrease into two. In one embodiment, the number of the orthogonal sequence used for multiplexing three-symbol TTI length is also two. In one embodiment, one resource for transmitting ACK/NACK response will map to one pair of an orthogonal sequence and a cyclic shift value.

Figure 11:
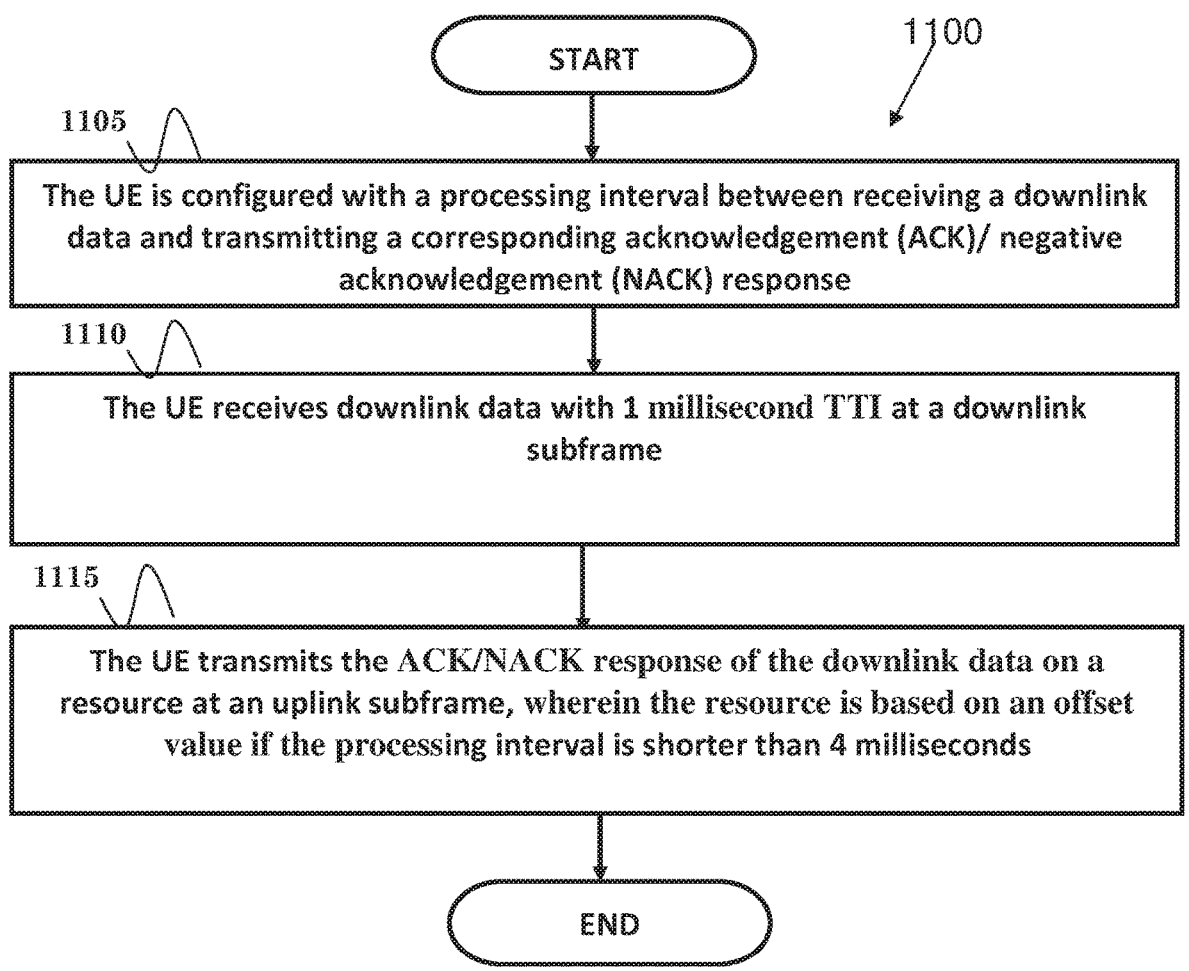
FIG. 11 is a flow diagram for one exemplary embodiment from the perspective of a user equipment (UE).

FIG. 11 is a flow chart 1100 according to one exemplary embodiment from the perspective of a UE. In step 1105, the UE is configured with a processing interval between receiving a downlink data and transmitting a corresponding acknowledgement (ACK)/negative acknowledgement (NACK) response. In step 1110, the UE receives downlink data with 1 millisecond TTI at a downlink subframe. In step 1115, the UE transmits the ACK/NACK response of the downlink data on a resource at an uplink subframe, wherein the resource is based on an offset value if the processing interval is shorter than 4 milliseconds.

Figure 12:
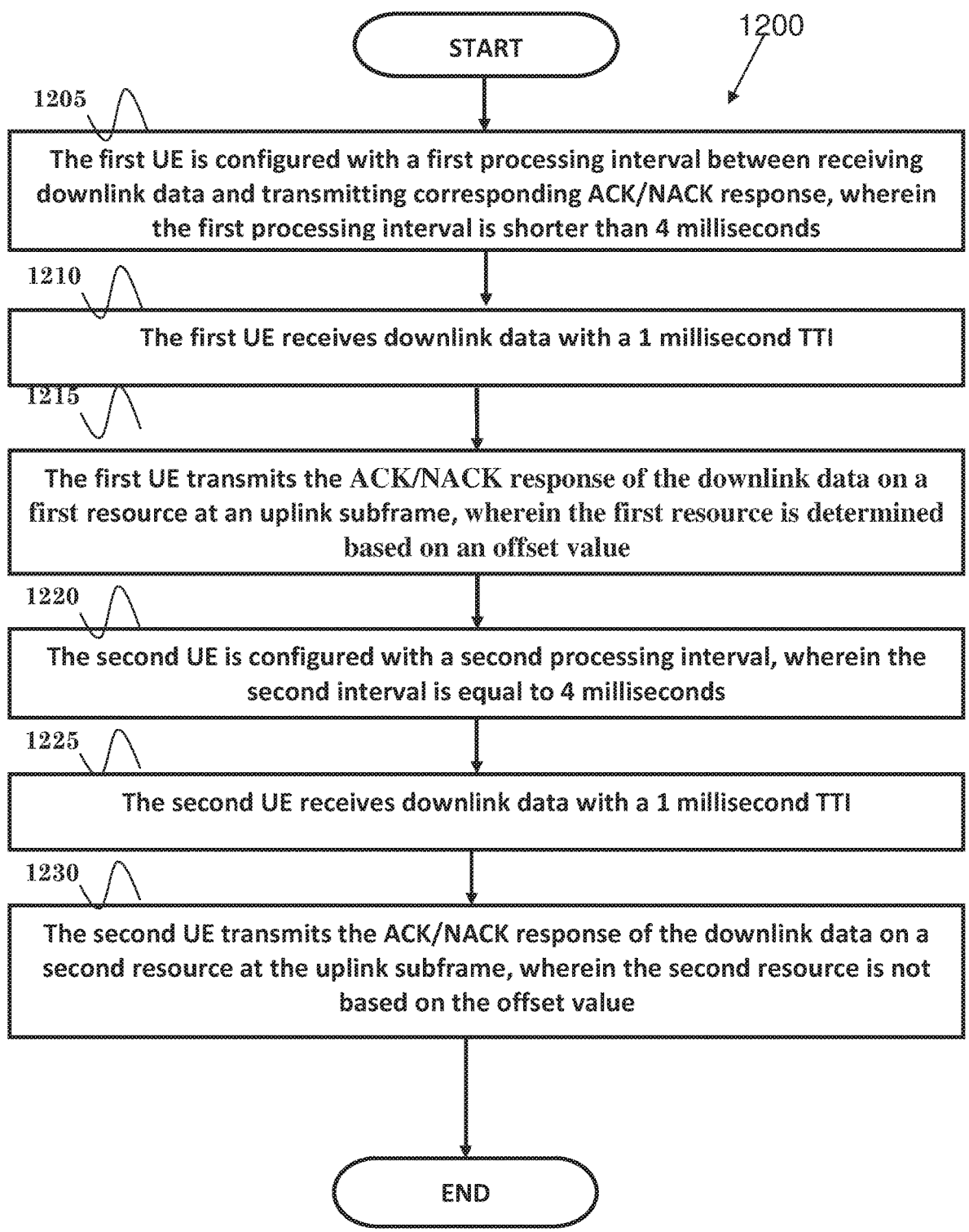
FIG. 12 is a flow diagram for another exemplary embodiment from the perspective of a network.

FIG. 12 is a flow chart 1200 according to one exemplary embodiment from the perspective of a network. In step 1205, the first UE is configured by the network with a first processing interval between receiving downlink data and transmitting corresponding ACK/NACK response, wherein the first processing interval is shorter than 4 milliseconds. In step 1210, the first UE receives downlink data with a 1 millisecond TTI from the network. In step 1215, the first UE transmits the ACK/NACK response of the downlink data on a first resource at an uplink subframe, wherein the first resource is determined based on an offset value. In step 1220, a second UE is configured by the network with a second processing interval, wherein the second interval is equal to 4 milliseconds. In step 1225, the second UE receives downlink data with a 1 millisecond TTI from the network. In step 1230, the second UE transmits the ACK/NACK response of the downlink data on a second resource at the uplink subframe, wherein the second resource is not based on the offset value.

In another exemplary method for an ACK/NACK response, a network configures one or more TTI(s) which is shorter than one subframe to a first UE, in which there are X TTIs in one subframe. The network transmits downlink data to the first UE with a first TTI with a configured length, and the network receives the corresponding ACK/NACK response transmitted by the UE on a resource at a first specific uplink subframe, wherein the resource is within a first resource set which is used for transmitting the ACK/NACK response for the downlink data transmitted with the first TTI. The network configures a TTI which is shorter than or equal to one subframe to a second UE, wherein there are Y TTIs in one subframe. The network transmits downlink data to the second UE with a second TTI with a configured length, and the network receives the corresponding ACK/NACK response transmitted by the UE on a second resource at a second specific uplink subframe, wherein the resource is within a second resource set which is used for transmitting the ACK/NACK response for the downlink data transmitted with the second TTI.

In other methods, the first specific uplink subframe and the second specific subframe are the same for first UE and the second UE. Alternately, the first specific uplink subframe index is n, and the downlink subframe index is n−1 where the X TTIs is transmitted at.

In other methods, the second specific uplink subframe index is n, and the downlink subframe index is n−3 and n−4 where Y TTIs are transmitted and Y is equal to one. Alternately, the second specific uplink subframe index is n, the downlink subframe index is n−2 where the Y TTIs is transmitted and Y is more than one.

In one of the above-disclosed methods, the value of X is more than 1, and the value of Y is more than or equal to one. In the above-disclosed methods, the TTI length is the same among the X TTIs. Alternately, the TTI length is different among the X TTIs, wherein the difference of two TTI lengths is one. In another alternative, there are two TTI length among X TTIs, wherein the first length is two-symbols and the second length is three-symbols.

In one of the above-disclosed methods, the resources for transmitting the ACK/NACK response of configured TTIs for downlink data corresponding to a first TTI for the ACK/NACK response are within a first resource set in the first TTI.

In one of the above-disclosed methods, the resources for transmitting the ACK/NACK response of configured TTIs for downlink data corresponding to the second TTI for the ACK/NACK response are within a first resource set in the second TTI.

In another exemplary method for ACK/NACK response, a first UE is configured with TTI(s) that are shorter than one subframe, wherein there are X TTIs in one subframe. The first UE receives downlink data with a first TTI and transmits an ACK/NACK response of the downlink data on a resource at a specific uplink subframe, wherein the resource is within a first resource set which is used for transmitting the ACK/NACK response for the downlink data transmitted with the first TTI. A second UE is configured with TTI(s) which are shorter than or equal to one subframe, wherein there are Y TTIs in one subframe. The second UE receives downlink data with a second TTI and transmits an ACK/NACK response of the downlink data on a resource at the specific uplink subframe, wherein the resource is within a second resource set which is used for transmitting the ACK/NACK response for the downlink data transmitted with the second TTI.

In another method, a third UE is configured with TTI(s) which is/are shorter than one subframe, wherein there are X TTIs in one subframe. The third UE receives downlink data in a TTI and transmits an ACK/NACK response of the downlink data on a resource at the specific uplink subframe, wherein the resource is within a first resource set which is used for transmitting the ACK/NACK response for the downlink data with the TTI.

In yet another method, a fourth UE is configured with TTI(s) which are shorter than or equal to one subframe, wherein there are Y TTIs in one subframe. The UE receives downlink data in a TTI and transmits an ACK/NACK response of the downlink data on a resource at the specific uplink subframe, wherein the resource is within a second resource set which is used for transmitting the ACK/NACK response for the downlink data with the TTI.

In one of the above-disclosed methods, the specific uplink subframe is the same for the first UE and the second UE.

In one of the above-disclosed methods, the first resource set is used for transmitting the ACK/NACK responses for the downlink data in TTIs which are within X TTIs.

In one of the above-disclosed methods, the second resource set is used for transmitting ACK/NACK responses for the downlink data in TTIs which are within Y TTIs.

In one of the above-disclosed methods, the specific uplink subframe index is n, and the downlink subframe index is n−1 where the X TTIs transmitted at.

In one of the above-disclosed methods, the specific uplink subframe index is n, and the downlink subframe index is n−3 and n−4 where the Y TTI(s) transmitted and the value of Y is equal to one.

In one of the above-disclosed methods, the specific uplink subframe index is n, and the downlink subframe index is n−2 where the Y TTI(s) transmitted and the value of Y is more than one.

In one of the above-disclosed methods, the value of X is more than 1, and the value of Y is more than or equal to one. In one of the above-disclosed methods, the value of X is 5 or 6.

In the above-disclosed methods, the TTI length is the same among the X TTIs. Alternately, the TTI length is different among the X TTIs, wherein the difference of two TTI lengths is one. In another alternative, there are two TTI length among X TTIs, wherein the first length is two-symbols and the second length is three-symbols.

In the above-disclosed methods, the resource which is one of the first resource set and is transmitted within the specific uplink subframe is based on a resource allocation index in a TTI within the X TTIs.

In the above-disclosed methods, the resource which is one of the second resource set and is transmitted within the specific uplink subframe is determined based on a resource allocation index in a TTI within the Y TTIs.

In the above-disclosed methods, the resource which is one of the first resource set and is transmitted within the specific uplink subframe is based on a minimum CCE index of the downlink control information transmitted in a TTI within the X TTIs.

In the above-disclosed methods, the resource which is one of the second resource set and is transmitted within the specific uplink subframe is based on a minimum CCE index of the downlink control information transmitted in a TTI within the Y TTIs.

In the above-disclosed methods, an index of the first resource in the first resource set is determined based on an offset value. In various methods, the offset value is broadcast to the first UE.

In the above-disclosed methods, an index of the second resource in the second resource set is determined based on an offset value. In various methods, the offset value is broadcast to the second UE.

In the above-disclosed methods, the offset value is based on the sum of resource set size of those previous downlink subframes which have corresponding ACK/NACK response transmitted at the specific uplink subframe.

In the above-disclosed methods, the offset value is based on the sum of resource set size of those previous downlink subframes transmitting the ACK/NACK response at the specific uplink subframe.

In another exemplary method for ACK/NACK response, a first UE is configured with TTI(s) that are shorter than one subframe, wherein there are X TTIs in one subframe. The UE receives downlink data in a first TTI with configured length and transmits an ACK/NACK response of the downlink data on a resource at a specific uplink subframe, wherein the resource is based on a first offset and an index. A second UE is configured with TTI(s) which are shorter than or equal to one subframe, wherein there are Y TTIs in one subframe. The UE receives downlink data in a second TTI with a configured length and transmits an ACK/NACK response of the downlink data on a resource at a specific uplink subframe, wherein the resource is based on a second offset and an index.

In above-disclosed methods, resources for transmitting the ACK/NACK response for configured TTIs for downlink data corresponding to a first TTI for the ACK/NACK response are based on the first offset value in the first TTI.

In the above-disclosed methods, resources for transmitting the ACK/NACK response for configured TTIs for downlink data corresponding to a second TTI for the ACK/NACK response are based on the first offset value in the second TTI.

In the above-disclosed methods, the first offset is the sum of the number of transmissions in a TTI of downlink subframes which have corresponding ACK/NACK responses at the specific uplink subframe.

In the above-disclosed methods, the number of transmissions in a TTI of downlink subframes which have corresponding ACK/NACK response at the specific uplink subframe is based on resource allocation band for the TTI.

In the above-disclosed methods, the second offset is the sum of the number of transmissions in a TTI of downlink subframes which have corresponding ACK/NACK response at the specific uplink subframe.

In the above-disclosed methods, the number of transmissions in a TTI of downlink subframes which have corresponding ACK/NACK response at the specific uplink subframe is determined based on resource allocation band for the TTI.

In another exemplary method for ACK/NACK response, a UE is configured with TTI(s) for downlink data which is shorter than one subframe, wherein there are X TTIs in one subframe. The UE is configured with a TTI for ACK/NACK response which is different from the configured TTI for the downlink data. Resources for transmitting the ACK/NACK response of the configured TTIs for the downlink data corresponding to a first TTI for the ACK/NACK response are within a first resource set in the first TTI. Resources for transmitting the ACK/NACK response of the configured TTIs for the downlink data corresponding to a second TTI for ACK/NACK response are within a first resource set in the second TTI.

In another method, the first resource set is separated into Z parts, wherein Z is the number of configured TTIs within X TTIs which transmit ACK/NACK responses corresponding to the first TTI. In one method, the size of each part is the same.

In the above-disclosed methods, the length of the first TTI is longer than the configured TTI for downlink data.

In the above-disclosed methods, the length of the second TTI is longer than the configured TTI for downlink data In the above-disclosed methods, the ACK/NACK response for the downlink data transmissions in different configured TTI corresponding to the first TTI is transmitted on different resource within the first resource set.

In the above-disclosed methods, the first resource set are separated based on an order of the resource index. In another method, the first resource set are separated based on an order of the configured TTI index.

In another exemplary method for ACK/NACK response, a UE is configured with two-symbol TTI or three-symbol TTI. The UE receives downlink data in a TTI and transmits an ACK/NACK response of the downlink data on a first resource in TTI within two-symbols or three-symbols at a specific uplink subframe, wherein the first resource and the second are different at a code domain. The UE receives downlink data in one millisecond TTI and transmits an ACK/NACK response of the downlink data on a second resource in millisecond TTI at the specific uplink subframe.

In the above-disclosed methods, a pair of orthogonal sequence and cyclic shift is derived from the first resource, wherein the length of orthogonal is as same as configured TTI length.

In the above-disclosed methods, a pair of orthogonal sequence and cyclic shift is derived from the second resource.

In the above-disclosed methods, the combination of two-symbol TTIs and three symbol TTIs does not overlap with each other and is in an order of two-symbol, three-symbol, and two-symbol in each slot.

In the above-disclosed methods, the first resource and the second resource are multiplexed through the different pair of orthogonal sequence and cyclic shift.

Referring back to FIGS. 3 and 4, in one embodiment, the device 300 includes a program code 312 stored in memory 310. The CPU 308 could execute program code 312 to enable the UE (i) to configure the UE with a processing interval between receiving a downlink data and transmitting a corresponding acknowledgement (ACK)/negative acknowledgement (NACK) response; (ii) to receive downlink data with 1 millisecond TTI at a downlink subframe; and (iii) to transmit the ACK/NACK response of the downlink data on a resource at an uplink subframe, wherein the resource is based on an offset value if the processing interval is shorter than 4 milliseconds.

In another embodiment, the CPU 308 could execute program code 312 to enable the network (i) to configure a first UE with a first processing interval between receiving downlink data and transmitting corresponding ACK/NACK response, wherein the first processing interval is shorter than 4 milliseconds; (ii) to have a first UE receive downlink data with 1 millisecond TTI; and (iii) to have a first UE transmit the ACK/NACK response of the downlink data on a first resource at an uplink subframe, wherein the first resource is determined based on an offset value; (iv) to configure a second UE with a second processing interval, wherein the second processing interval is equal to 4 milliseconds; and (v) to transmit by the second UE the ACK/NACK response of the downlink data on a second resource at the uplink subframe, wherein the second resource is not based on the offset value.

Furthermore, the CPU 308 can execute the program code 312 to perform all of the above-described actions and steps or others methods described herein.

Based on the invention, collision of multiple (UL) transmissions and/or (DL) receptions on multiple UE beams can be handled considering UE beamforming restriction.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for improving hybrid automatic repeat request (HARQ) feedback, the method comprising:
receiving, by a user equipment (UE), a signal of configuration of a processing interval from a network, wherein the processing interval is between receiving a downlink data with a 1 millisecond time transmission interval (TTI) and transmitting a HARQ feedback comprising a corresponding acknowledgement (ACK)/negative acknowledgement (NACK) response;
receiving, by the UE, downlink data with 1 millisecond TTI at a downlink subframe; and
transmitting, by the UE, the ACK/NACK response of the downlink data on a first resource with a 1 millisecond TTI at an uplink subframe, wherein the first resource is based on a first offset value if the processing interval is equal to 3 milliseconds and the first resource is based on a second offset value if the process interval is equal to 4 milliseconds,
wherein the first resource derived from the first offset value and the first resource derived from the second offset value are in the same time-frequency resource with different pair of orthogonal sequence and cyclic shift value, or the first resource derived from the first offset value and the first resource derived from the second offset value are in different frequency resource.

2. The method of claim 1, wherein the first offset value is determined based on a number of resources reserved for the ACK/NACK response of downlink data with a 4 milliseconds processing interval, wherein the ACK/NACK response is transmitted at the uplink subframe.

3. The method of claim 1, further comprising: broadcasting the first offset value to the UE.

4. The method of claim 1, wherein the downlink subframe index is n−3, and the uplink subframe index is n.

5. The method of claim 1, wherein the first resource is determined based on a minimum control channel element (CCE) index of the downlink control information scheduling the downlink data.

6. The method of claim 1, wherein the first resource is not based on the first offset value if the processing interval is equal to 4 milliseconds.

7. The method of claim 1, wherein the first processing interval is equal to 3 milliseconds; and wherein the method further comprises:
receiving, by a second UE, a second signal of configuration of a second processing interval, wherein the second processing interval is equal to 4 milliseconds;
receiving, by the second UE, a second downlink data with a 1 millisecond TTI; and
transmitting, by the second UE, the ACK/NACK response of the downlink data on a second resource with a 1 millisecond TTI at the uplink subframe, wherein the second resource is not based on the first offset value.

8. The method of claim 7, wherein the second resource is based on a minimum control channel element (CCE) index of the downlink control information scheduling the second downlink data.

9. The method of claim 1, wherein the first offset value is the same for 3 milliseconds processing interval over a plurality of uplink subframes, and the first offset value does not change or is not allowed to change over the plurality of uplink subframes.

10. A User Equipment (UE), comprising:
a control circuit;
a processor installed in the control circuit; and
a memory installed in the control circuit and coupled to the processor;
wherein the processor is configured to execute a program code stored in the memory to:
receive a signal of configuration of a processing interval from a network, wherein the processing interval is between receiving a downlink data with a 1 millisecond time transmission interval (TTI) and transmitting a hybrid automatic repeat request (HARQ) feedback comprising a corresponding acknowledgement (ACK)/negative acknowledgement (NACK) response;
receive downlink data with 1 millisecond TTI at a downlink subframe; and
transmit the ACK/NACK response of the downlink data on a first resource with a 1 millisecond TTI at an uplink subframe, wherein the first resource is based on an offset value if the processing interval is equal to 3 milliseconds and the first resource is based on a second offset value if the process interval is equal to 4 milliseconds,
wherein the first resource derived from the first offset value and the first resource derived from the second offset value are in the same time-frequency resource with different pair of orthogonal sequence and cyclic shift value, or the first resource derived from the first offset value and the first resource derived from the second offset value are in different frequency resource.

11. The UE of claim 10, wherein the offset value is determined based on a number of resources reserved for the ACK/NACK response of downlink data with a 4 milliseconds processing interval, wherein the ACK/NACK response is transmitted at the uplink subframe.

12. The UE of claim 10, further comprising: broadcasting the offset value to the UE.

13. The UE of claim 10, wherein the downlink subframe index is n−3, and the uplink subframe index is n.

14. The UE of claim 10, wherein the first resource is determined based on a minimum control channel element (CCE) index of the downlink control information scheduling the downlink data.

15. The UE of claim 10, wherein the first resource is not based on the first offset value if the processing interval is equal to 4 milliseconds.

16. The method of claim 10, wherein the second resource is based on a minimum control channel element (CCE) index of the downlink control information scheduling the second downlink data.

17. The method of claim 10, wherein the first offset value is the same for 3 milliseconds processing interval over a plurality of uplink subframes, and the first offset value does not change or is not allowed to change over the plurality of uplink subframes.

18. A method for a network, comprising:
transmitting a signal of configuration of a processing interval between transmitting a downlink data with a 1 millisecond time transmission interval (TTI) and receiving a hybrid automatic repeat request (HARQ) feedback comprising a corresponding acknowledgement (ACK)/negative acknowledgement (NACK) response to a user equipment (UE);
transmitting downlink data with a 1 millisecond TTI at a downlink subframe to the UE; and
receiving the ACK/NACK response of the downlink data from the UE on a first resource with a 1 millisecond TTI at an uplink subframe, wherein the first resource is determined based on a first offset value if the processing interval is equal to 3 milliseconds, and the first resource is determined based on a second offset value if the processing interval is equal to 4 milliseconds,
wherein the first resource derived from the first offset value and the first resource derived from the second offset value are in the same time-frequency resource with different pair of orthogonal sequence and cyclic shift value, or the first resource derived from the first offset value and the first resource derived from the second offset value are in different frequency resource.

19. The method of claim 18, wherein the first offset value is determined based on a number of resources reserved for the ACK/NACK response of downlink data with a 4 milliseconds processing interval, wherein the ACK/NACK response is transmitted at the uplink subframe.

20. The method of claim 18, further comprising: broadcasting the first offset value to the UE.

21. The method of claim 18, wherein the downlink subframe index is n−3, and the uplink subframe index is n.

22. The method of claim 18, wherein the first resource is not based on the first offset value if the processing interval is equal to 4 milliseconds.

23. The method of claim 18, wherein the first resource is determined based on a minimum control channel element (CCE) index of the downlink control information scheduling the downlink data.

24. The method of claim 18, wherein the processing interval configured for the UE is equal to 3 milliseconds, and wherein the method further comprises:
transmitting a third signal of configuration of a second processing interval to a second UE, wherein the second processing interval is equal to 4 milliseconds;
transmitting a second downlink data with a 1 millisecond TTI to the second UE; and
receiving the ACK/NACK response of the second downlink data on a second resource with a 1 millisecond TTI at the uplink subframe, wherein the second resource is not based on the first offset value.

25. The method of claim 18, wherein the second resource is based on a minimum control channel element (CCE) index of the downlink control information scheduling the second downlink data.

26. The method of claim 18, wherein the network receives HARQ feedbacks generated according to different processing intervals at a same uplink subframe.

27. The method of claim 18, wherein the first offset value is the same for 3 milliseconds processing interval over a plurality of uplink subframes, and the first offset value does not change or is not allowed to change over the plurality of uplink subframes.

* * * * *